(12) United States Patent
Machii

(10) Patent No.: US 7,864,436 B2
(45) Date of Patent: Jan. 4, 2011

(54) REAR PROJECTION TYPE DISPLAY APPARATUS

(75) Inventor: Ritsuo Machii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 331 days.

(21) Appl. No.: 12/043,502

(22) Filed: Mar. 6, 2008

(65) Prior Publication Data

US 2008/0231932 A1 Sep. 25, 2008

(30) Foreign Application Priority Data

Mar. 19, 2007 (JP) .............................. 2007-069970

(51) Int. Cl.
*G02B 3/00* (2006.01)

(52) U.S. Cl. ..................................................... 359/649

(58) Field of Classification Search .......... 359/649–651
See application file for complete search history.

(56) References Cited

U.S. PATENT DOCUMENTS 6,565,213 B1 * 5/2003 Yamaguchi et al. ........... 353/33
2005/0259336 A1 * 11/2005 Kobayashi .................. 359/782

FOREIGN PATENT DOCUMENTS

JP 2004-069776 3/2004

* cited by examiner

*Primary Examiner*—Scott J Sugarman
(74) *Attorney, Agent, or Firm*—Fitzpatrick, Cella, Harper & Scinto

(57) ABSTRACT

A projection unit is mounted on a projection magnification correcting member, and the projection magnification correcting member includes a first member and a second member. The first member includes a first correction mechanism for correction in a direction parallel to a central light ray, and is supported by a housing. The second member includes a second correction mechanism for correction in a direction parallel to a normal line to an image plane enlarged and projected from the projection unit without passing through a reflection mirror, and is supported by the first member.

14 Claims, 16 Drawing Sheets

REAR PROJECTION TYPE DISPLAY APPARATUS

BACKGROUND OF THE INVENTION

1. Field of the Invention

The present invention relates to a rear projection type display apparatus that enlarges and displays a display image on a light valve such as a liquid crystal panel.

2. Description of the Related Art

In recent years, there is known a rear projection type display apparatus reduced in thickness. The rear projection type display apparatus includes a projection unit which modulates an illumination light from a light source with a light valve to enlarge and project the modulated illumination light onto a rear surface of a screen with a projection optical system. Light rays are projected by the projection unit such that a central light ray passing through a center of an image is made incident on the rear surface of the screen at an angle other than 90 degrees through one or multiple reflection mirrors of the projection optical system.

For example, a rear projection type display apparatus as disclosed in Japanese Patent Application Laid-Open No. 2004-069776 has a structure for moving the projection unit in a depth direction with one axis of a 6-axis correction mechanism for the image, to thereby correct a projection magnification of the image.

In a case of producing the rear projection type display apparatus, the reduction in thickness is important. However, when the projection magnification is corrected by the 6-axis correction mechanism of the related art, a correction amount in the depth direction is necessary, which makes it difficult to realize the reduction in thickness.

When the projection magnification is corrected merely by moving a projection magnification correcting member having the projection unit mounted thereon, in a direction of the central light ray (substantially vertical direction) of light rays to be projected from the projection unit, it is difficult to perform the correction in a stepless manner because the projection magnification correcting member having the projection unit mounted thereon is heavy.

SUMMARY OF THE INVENTION

It is an object of the present invention to provide a rear projection type display apparatus having a structure capable of performing projection magnification correction with a small depth.

In order to solve the above-mentioned problems in the related art, according to the present invention, there is provided a rear projection type display apparatus, including: a screen; a projection optical system having at least one reflection mirror; a projection unit for modulating an illumination light from a light source with a light valve and for enlarging and projecting the illumination light onto a rear surface of the screen with the projection optical system; and a projection magnification correcting member, light rays being projected from the projection unit so that a central light ray, which is a ray passing through a center of an image, is made incident on the rear surface of the screen at an angle other than 90 degrees through the at least one reflection mirror of the projection optical system, in which: the projection unit is mounted on the projection magnification correcting member; the projection magnification correcting member includes a first member and a second member; the first member includes a first correction mechanism for correction in a direction parallel to the central light ray, and is supported by a housing; and the second member includes a second correction mechanism for correction in a direction parallel to a normal line to an image plane enlarged and projected from the projection unit without passing through the reflection mirror, and is supported by the first member.

The rear projection type display apparatus according to the present invention performs rough adjustment correction of a position of the projection unit with the first member, and performs fine adjustment correction thereof with the second member. In other words, the projection magnification of the image is corrected as much as possible through rough correction of the projection magnification, so a correction amount in a depth direction can be sufficiently suppressed, which contributes to a reduction in thickness of the rear projection type display apparatus.

Further features of the present invention will become apparent from the following description of an exemplary embodiment with reference to the attached drawings.

DESCRIPTION OF THE EMBODIMENTS

Figure 1:
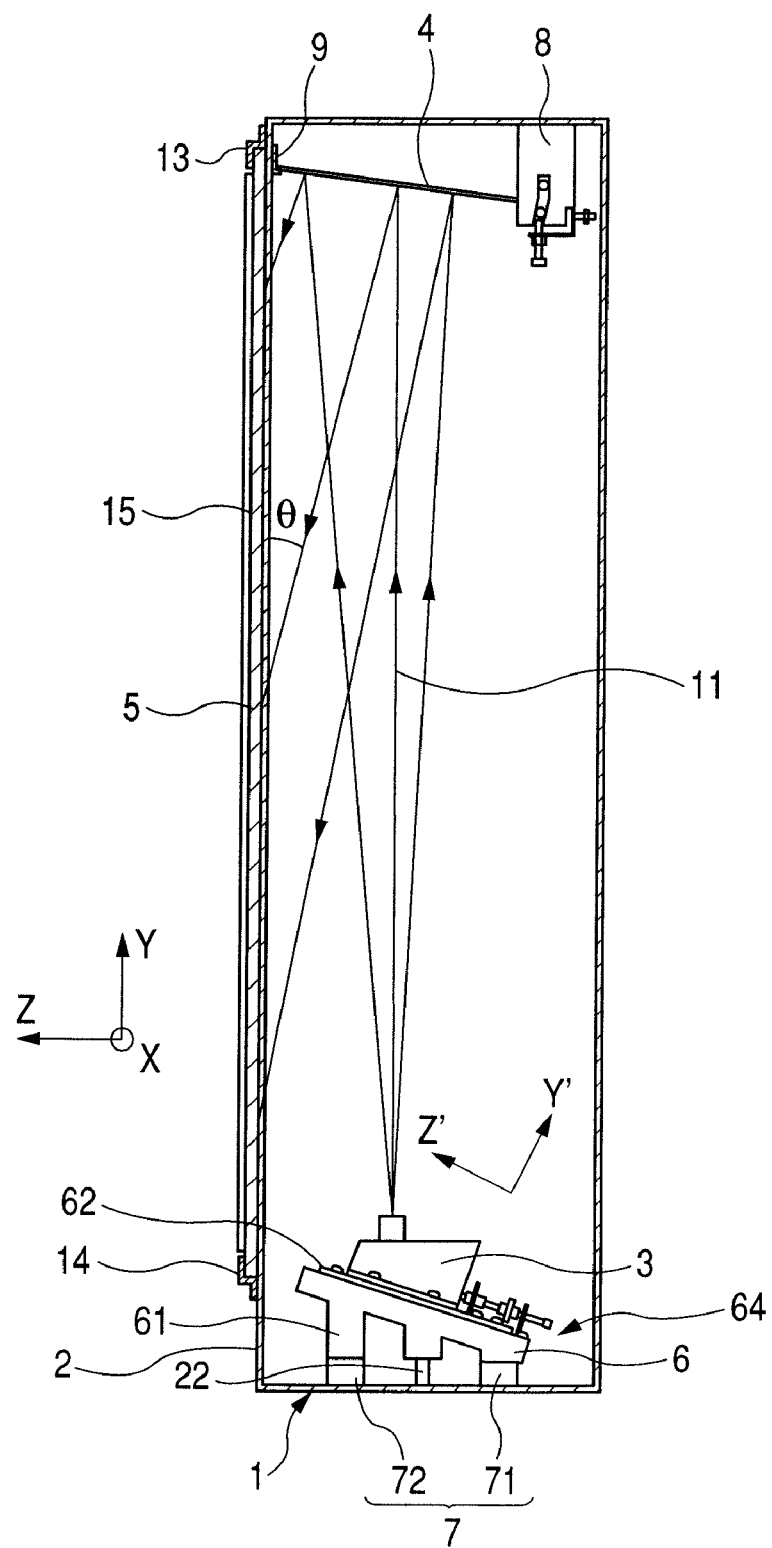
FIG. 1 is a side view of a rear projection type display apparatus according to Embodiment 1 of the present invention.

Preferred embodiments of the present invention will now be described in detail in accordance with the accompanying drawings.

Here, examples of a displacement occurring on a screen include six kinds of displacements, that is, a vertical displacement, a horizontal displacement, a tilt, a projection magnification, vertical trapezoidal distortion, and horizontal trapezoidal distortion, and a combination thereof. In other words, there are generated a screen image with an improper projection magnification with respect to a screen (magnification improper screen image), a screen image inclined with respect to the screen (tilt improper screen image), and a screen image with a vertical direction and a horizontal direction improperly set with respect to the screen (vertically and horizontally improper screen image). In addition, there are generated a screen image obtained when vertical trapezoidal distortion occurs (vertical trapezoidal improper screen image) and a screen image obtained when horizontal trapezoidal distortion occurs (horizontal trapezoidal improper screen image). The rear projection type display apparatus according to the present invention is capable of correcting the magnification improper screen image to an appropriate image with a small depth.

Note that, for convenience of description, an X-axis direction is set as a horizontal direction viewed from a front surface of a screen, a Y'-axis direction is set as a direction vertical to an inclined surface of a first member, and a Z'-axis direction is set as a direction (substantially back-and-forth direction assuming that a screen side is set as a front side and an opposite side is set as a back side) parallel to the inclined surface of the first member. However, the present invention is not limited thereto.

Hereinafter, embodiments of the present invention will be described.

In the drawings, there are illustrated: a rear projection type display apparatus 1; a housing 2; screw holes 23, 24, 25, and 26; a projection unit 3; a reflection mirror 4; a screen 5; a projection magnification correcting member 6; a first member 61; lock holes 613 and 614; through holes 615, 616, 617, and 618; shafts 611 and 612; a second member 62; screws 621, 622, 623, and 624; a folded portion 625; long holes 626 and 627; a second correction mechanism 64; a screw 641; nuts 642 and 643; a screw mounting plate 644; a first correction mechanism 7 (71, 72, 73); a horizontal trapezoidal distortion correcting member 16; a third member 161; screws 162, 163, 164, and 165; a third correction mechanism 166; a reflection mirror correcting member 8; a reflection mirror supporting member 9; a central light ray 11; first correction mechanisms 10 and 12; coupling projections 21 and 22; fixation members 101 and 121; holding members 102 and 122; through holes 1011 and 1012; a lock hole 1013 (10131, 10132, 10133, 10134); a lock hole 1014 (10141, 10142, 10143, 10144); a through hole 1015 (10151, 10152, 10153, 10154); a through hole 1016 (10161, 10162, 10163, 10164); screw holes 1021 and 1022; coupling projections 1023 and 1024; screw holes 1025 and 1026; and a rising portion 619.

Embodiment 1

A description is given of Embodiment 1 of the present invention.

A rear projection type display apparatus 1 according to Embodiment 1 of the present invention includes: the housing 2 with a front surface being opened; the reflection mirror 4 provided in an upper portion within the housing 2; the projection unit 3 for projecting an output image substantially upward through the reflection mirror 4; and the screen 5 covering the front surface of the housing 2 (see FIG. 1). In addition, the rear projection type display apparatus 1 includes: the projection magnification correcting member 6 provided in a lower portion within the housing 2; the reflection mirror correcting member 8; the reflection mirror supporting member 9 for supporting the reflection mirror 4; screen holding members 13, 14, and 15 for holding the screen 5; and the horizontal trapezoidal distortion correcting member 16.

The projection unit 3 is mounted on the projection magnification correcting member 6, and has a structure in which an illumination light from a light source is modulated with a light valve (liquid crystal panel) and the modulated illumination light is enlarged and projected onto a rear surface of the screen 5 by a projection optical system. A light ray is projected by the projection unit 3 such that the central light ray 11, which is a light ray passing through a center of an image, is made incident on the rear surface of the screen at an angle θ other than 90 degrees through one or multiple reflection mirrors 4 (a single reflection mirror provided upward in this embodiment) of the projection optical system.

Figure 2:
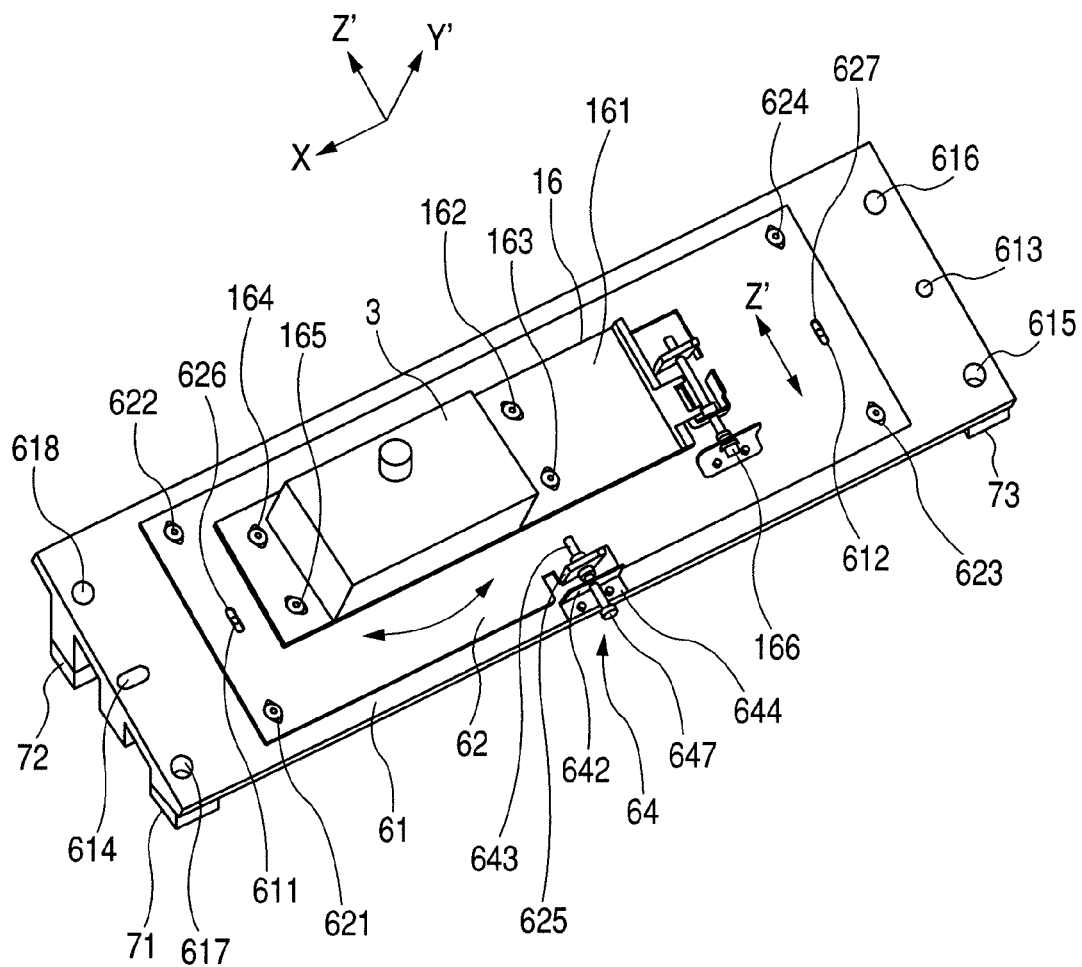
FIG. 2 is a perspective view of a projection magnification correcting member having a horizontal trapezoidal distortion correcting member mounted thereon.

The projection magnification correcting member 6 includes the first member 61 and the second member 62 (see FIGS. 1 and 2).

The first member 61 includes a base portion having multiple leg portions provided on a tilted plate with a plane area large enough to mount the second member 62, and the first correction mechanism 7 in a direction parallel to the central light ray 11, and is supported on a bottom surface within the housing 2.

Figure 3:
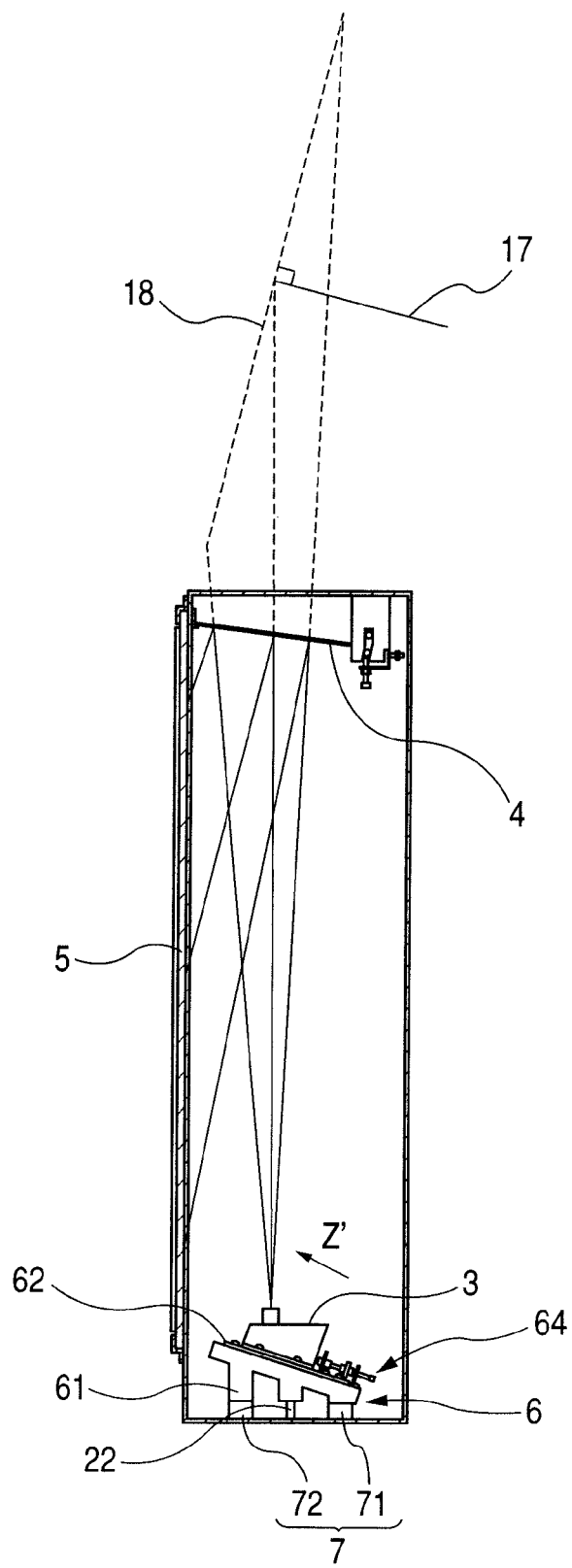
FIG. 3 is a diagram for illustrating a Z'-axis.

The tilted plate of the base portion is disposed in a direction parallel to a normal line to an image plane enlarged and projected from the projection unit 3 without passing through the reflection mirror 4. In addition, the tilted plate has the shafts 611 and 612 formed thereon, for axially supporting the second member 62. In this case, the dotted line of FIG. 3 represent an image enlarged and projected from the projection unit 3 without passing through the reflection mirror 4. In other words, the light ray to be projected on the screen 5 is reversed by the reflection mirror 4. A Z'-axis parallel to the tilted plate is in parallel to a normal line 17 to an image plane 18.

Figure 4:
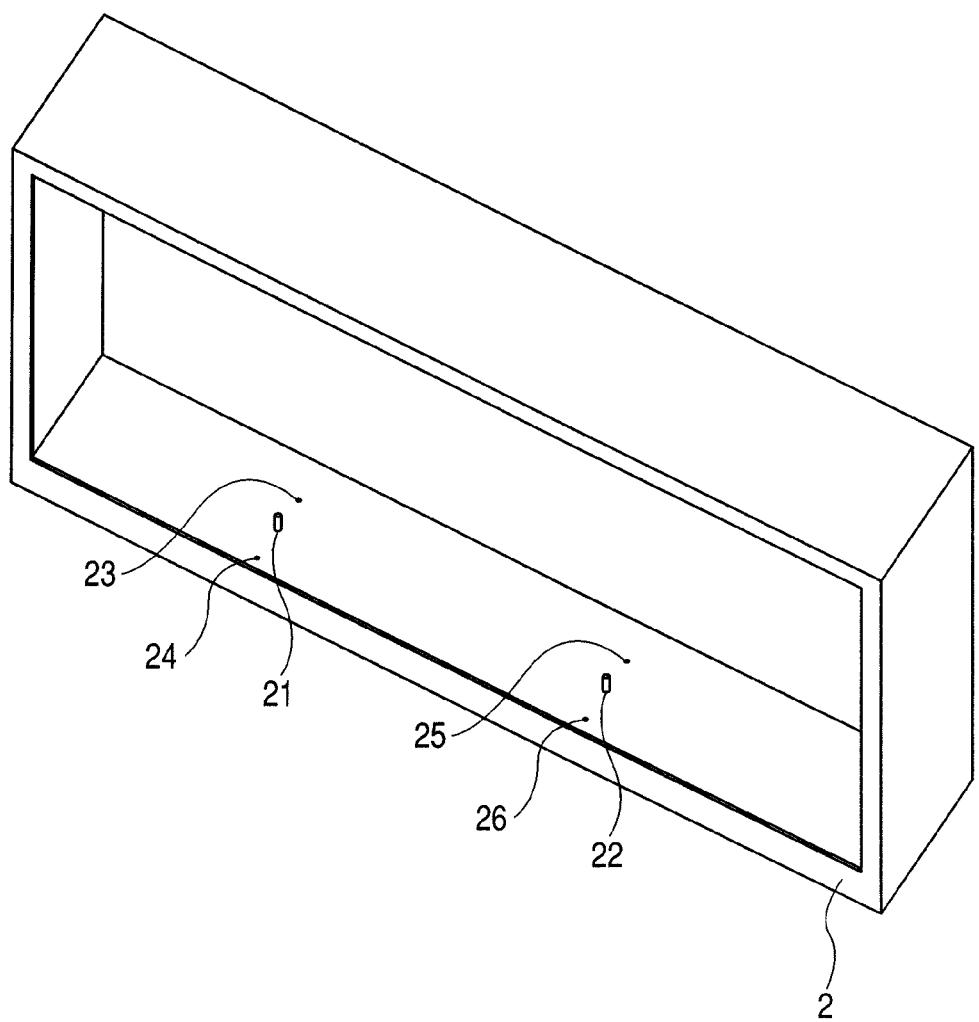
FIG. 4 is a perspective view of a housing of the rear projection type display apparatus.

In the base portion, there are formed the lock holes 613 and 614 for positioning the base portion on the bottom surface within the housing 2. The lock holes 613 and 614 are engaged with the coupling projections 21 and 22, which are provided on the bottom surface within the housing 2, respectively (see FIGS. 2 and 4). In this regard, the lock hole 614 is formed as a long hole in consideration of a fitting error.

In addition, in the base portion, there are formed the through holes 615, 616, 617, and 618 through which screws for fixing the base portion to the bottom surface within the housing 2 pass.

The first correction mechanism 7 is a block member (spacer) for moving the base portion in the direction parallel to the central light ray 11 of the image, and is provided between the leg portions of the base portion and the housing 2. A thickness of the first correction mechanism 7 or the number thereof is varied stepwise so as to move the base portion in the direction parallel to the central light ray 11 of the image, thereby enabling rough correction of a projection magnification (central light ray direction translation mechanism). Note that the base portion is moved stepwise because the base portion is moved according to the thickness or the number of the first correction mechanism 7 due to the fact that the projection magnification correcting member 6 having the projection unit 3 mounted thereon is heavy and it is necessary to secure a rigidity thereof.

After the rough correction is performed as described above, the screws passing through the through holes 615, 616, 617, and 618 of the base portion and further passing through the first correction mechanism 7 are screwed into the screw holes 23, 24, 25, and 26, which are formed in the bottom surface within the housing 2, respectively.

The second member 62 includes a flat plate portion which is slightly smaller than the tilted plate of the first member 61 and which has a plane area large enough to mount the projection unit 3, and the second correction mechanism 64 which is provided in a direction parallel to the normal line 17 to the image plane 18 enlarged and projected from the projection unit 3 without passing through the reflection mirror 4. The second member 62 is supported on a top surface of the first member 61.

The flat plate portion has the long holes 626 and 627 formed therein toward the Z'-axis direction. The long holes 626 and 627 are fitted into the shafts 611 and 612 of the first member 61, respectively, thereby enabling movement of the flat plate portion along the Z'-axis direction with the second correction mechanism 64 (Z'-axis translation mechanism).

The second correction mechanism 64 has the screw mounting plate 644 formed at a lower central position on the top surface of the tilted plate of the first member 61. On the other hand, the flat plate portion of the second member 62 is vertically folded at the lower central position, thereby obtaining the folded portion 625. The folded portion 625 has a screw hole formed at a position concentric with the screw hole of the screw mounting plate 644. A leading end of the screw 641, which is screwed into the screw hole of the screw mounting plate 644 of the first member 61, is screwed into the screw hole of the folded portion 625 of the second member 62, and is fixed with the nuts 642 and 643 through the folded portion 625. In other words, the screw 641 is rotated due to a reaction force acting on the screw mounting plate 644 of the first member 62, whereby the flat plate portion is moved in the Z'-axis direction in a stepless manner so as to be capable of fine correction of the projection magnification.

After the position adjustment toward the Z'-axis direction is performed by the second correction mechanism 64, the second member 62 is fixed to the first member 61 with screws 621, 622, 623, and 624.

In short, the projection magnification correcting member 6 having the above-mentioned structure performs rough adjustment correction of the position of the projection unit 3 with the first member 5 with respect to the screen 5 disposed at a predetermined position on an X-Y plane in XYZ axes, and then performs fine adjustment correction thereof with the second member 62. In other words, the projection magnification of the image is corrected as much as possible through the rough correction of the projection magnification, so a correction amount in a depth direction can be sufficiently suppressed, which contributes to a reduction in thickness of the rear projection type display apparatus.

A description is given of an image magnification correcting method, for example, in the case where the projection magnification is reduced.

Figure 5:
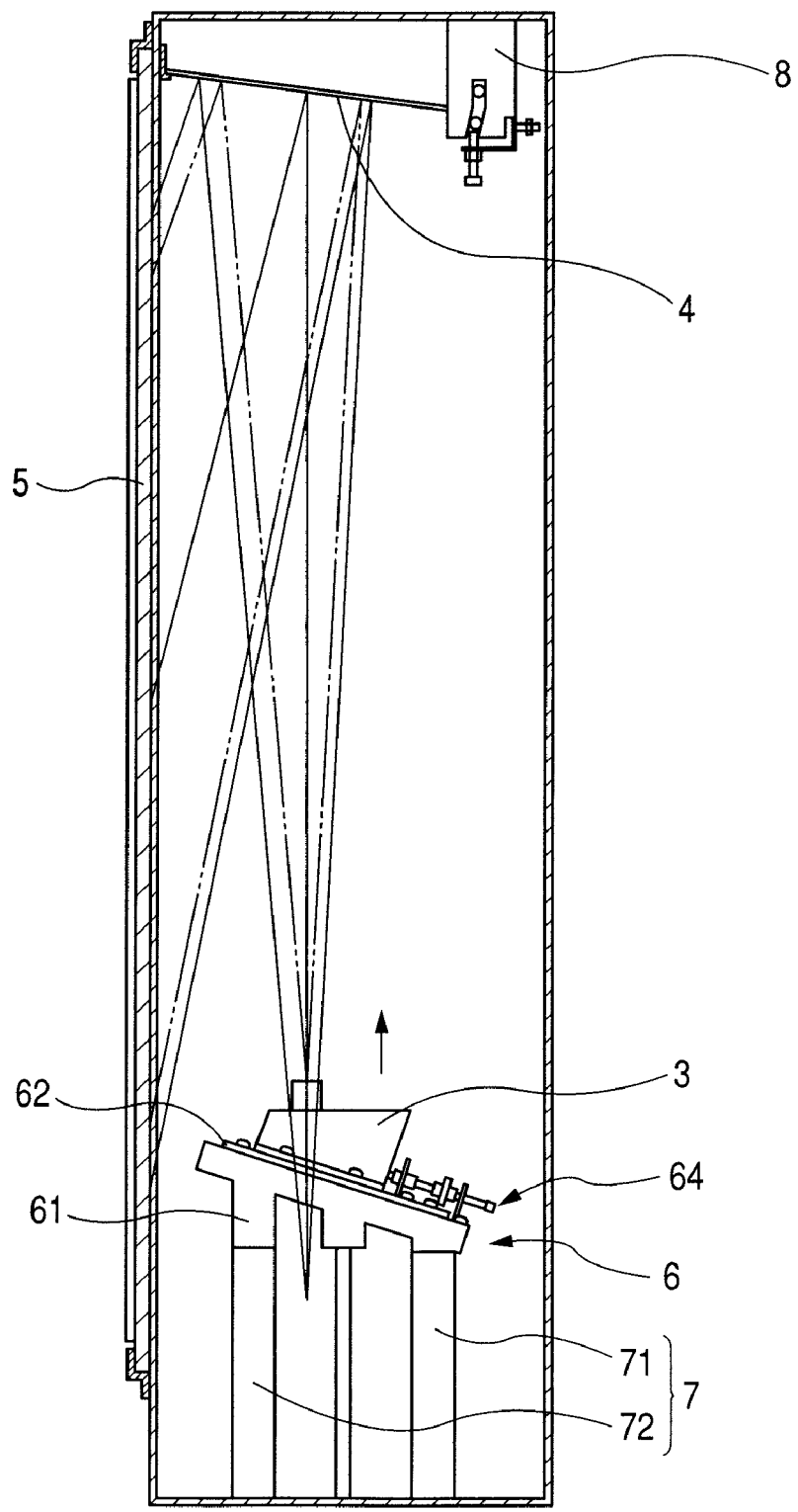
FIG. 5 is a side view of the rear projection type display apparatus in a state where the projection magnification correcting member is moved in a direction parallel to a central light ray of an image.
Figure 6:
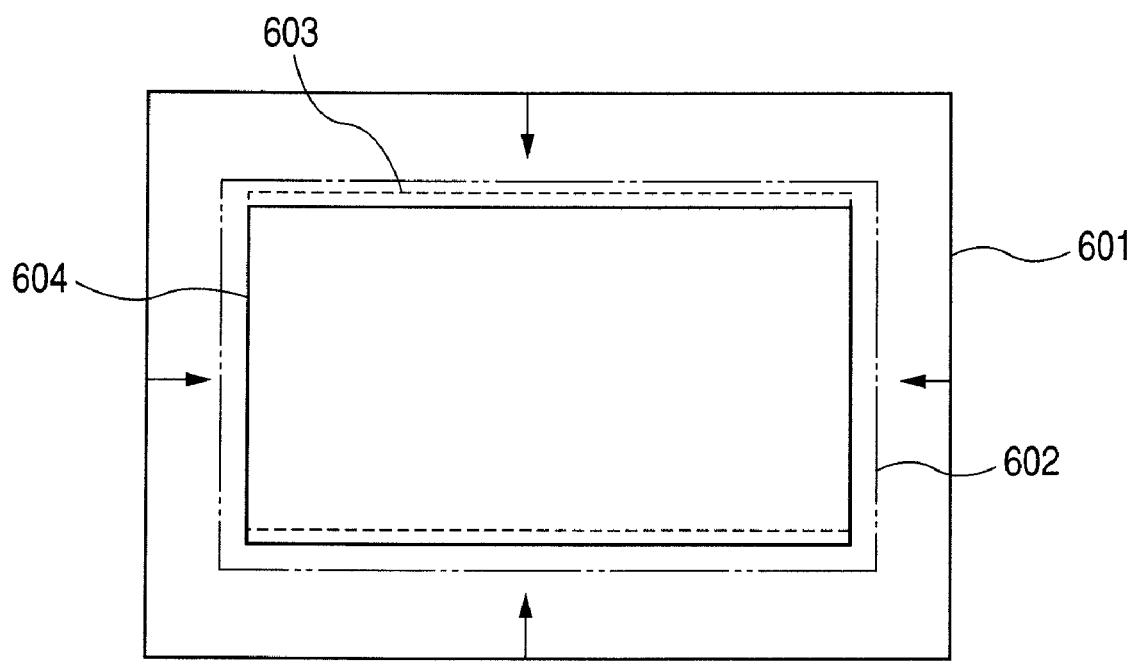
FIG. 6 is a diagram illustrating an image projected on a screen.

FIG. 1 is a side view of the rear projection type display apparatus with variations due to mass production immediately after assembly, and an image 601 illustrated in FIG. 6 is used. In FIG. 5, by merely changing the thickness of the first correction mechanism 7, the first member 61 of FIG. 1 is moved in the direction parallel to the central light ray 11 of the image, to thereby shorten an optical length. As a result, the size of the image is reduced, and rough correction is performed so as to obtain a size approximate to a normal size thereof with respect to the screen 5 (as indicated by alternate long and two short dashes lines of FIG. 5). An image 602 of FIG. 6 is obtained after the correction (as indicated by alternate long and two short dashes line of FIG. 6).

Figure 7:
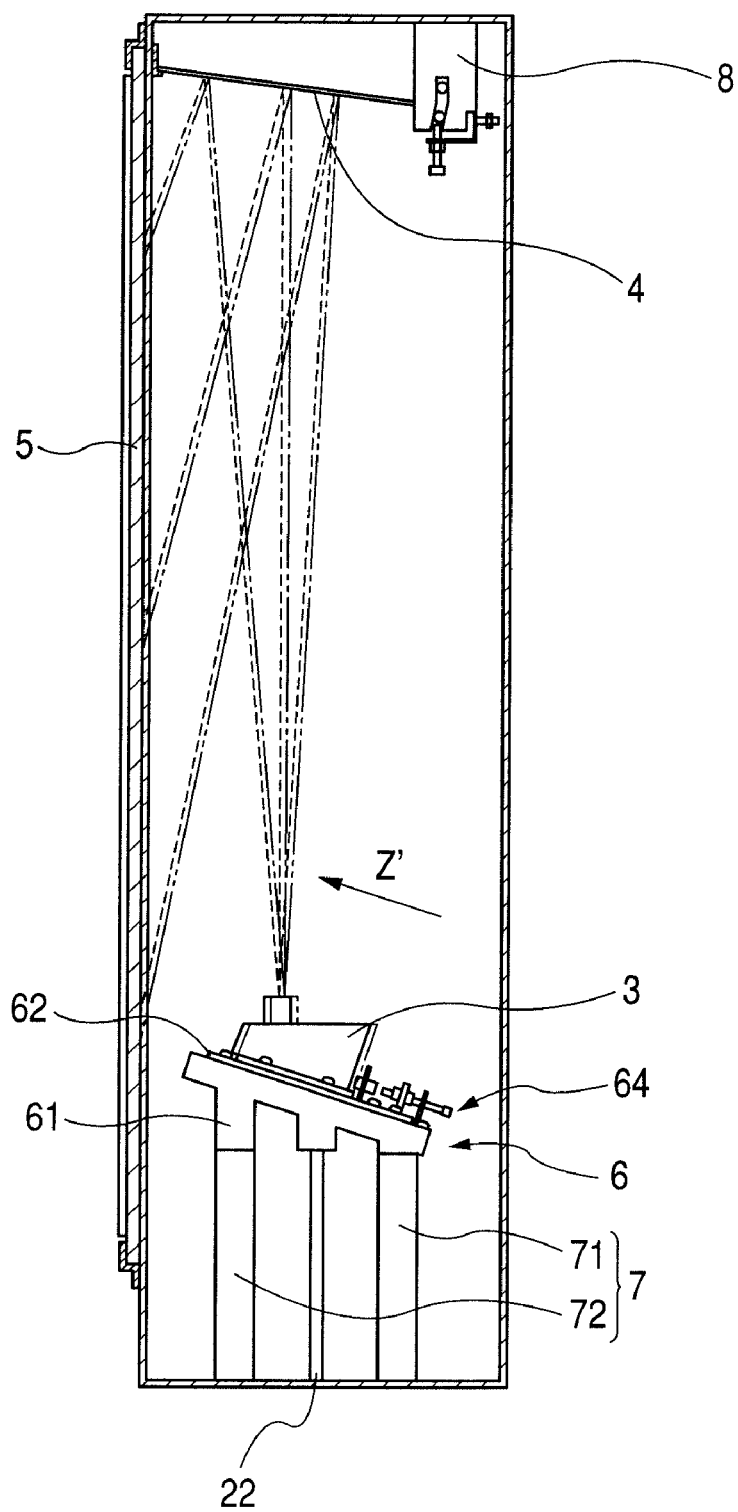
FIG. 7 is a side view of the rear projection type display apparatus in a state where the projection magnification correcting member is moved in a Z'-axis direction.

In FIG. 7, the second member 62 having the projection unit 3 mounted thereon as illustrated in FIG. 5 is moved in parallel to the Z'-axis direction to the screen side, to thereby shorten the optical length. As a result, the size of the image is reduced, and fine correction thereof is performed so as to obtain the same size as the normal size with respect to the screen 5 (as indicated by dotted lines of FIG. 7). An image 603 of FIG. 6 is obtained after the correction (as indicated by dotted line of FIG. 6).

Then, a position of a liquid crystal panel provided within the projection unit 3 is shifted downward, whereby the position of the image, which is displaced upward, is set to a normal position with respect to the screen 5. An image 604 of FIG. 6 is obtained after the correction (as indicated by thick solid line of FIG. 6).

In Embodiment 1 of the present invention, on the second member 62, the horizontal trapezoidal distortion correcting member 16 is provided as a mechanism for correction about a Y' axis. The horizontal trapezoidal distortion correcting member 16 includes the plate-like third member 161, which is slightly smaller than the second member 62 and has a plane area large enough to mount the projection unit 3, and the third correction mechanism 166 provided on a side thereof, and is supported on the second member 62. In this regard, the third correction mechanism 166 operates on the same principle as that of the second correction mechanism 64 of the second member 62, so a description thereof is omitted (Y'-axis rotation mechanism).

Figure 8:
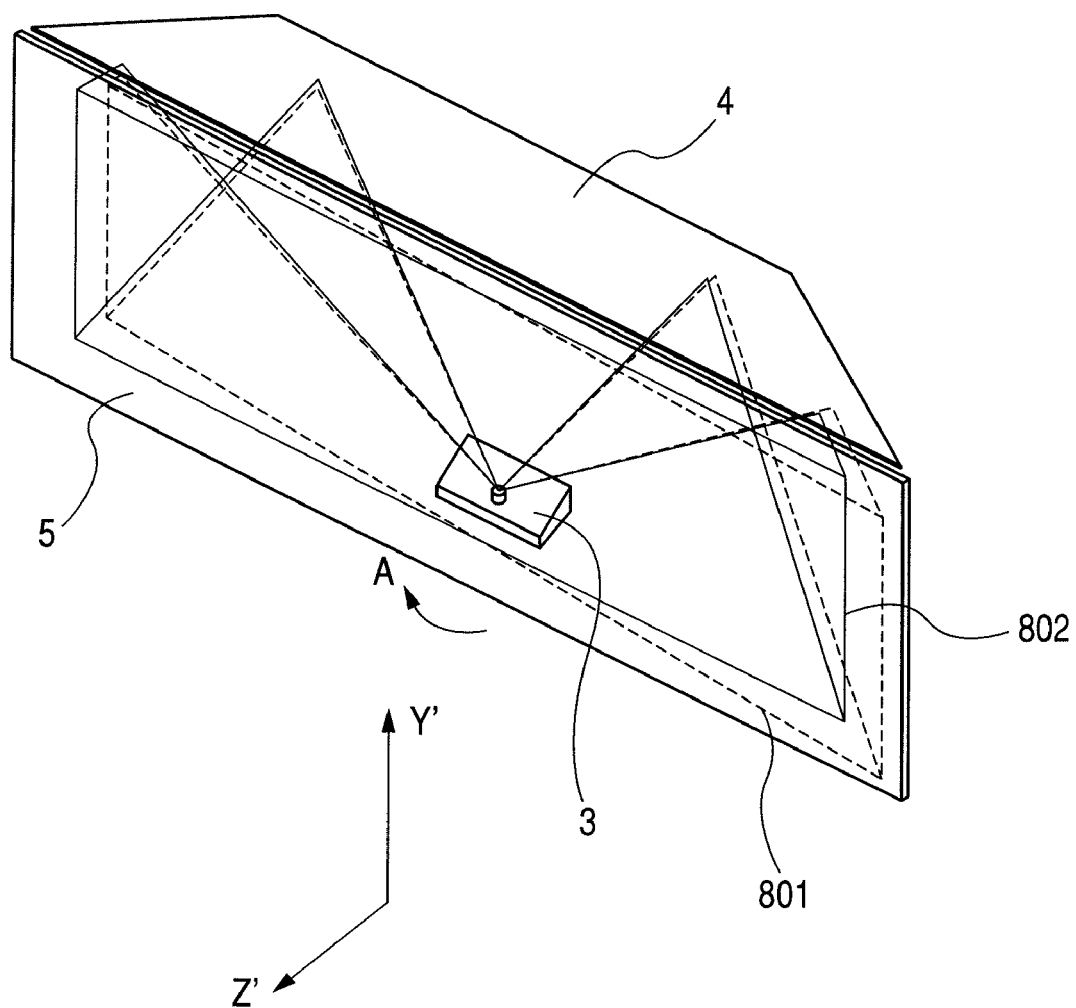
FIG. 8 is a diagram for illustrating a Y'-axis rotation mechanism.

Specifically, the rear projection type display apparatus according to Embodiment 1 of the present invention has a structure capable of correcting horizontal trapezoidal distortion of the image through the adjustment by the horizontal trapezoidal distortion correcting member 16. For example, in the case where the image to be projected on the screen 5 has a tilt (image with an left side and a right side which are not same in length) with respect to the screen 5 as indicated by a dotted line 801 of FIG. 8, the following adjustment is performed. The third member 161 having the projection unit 3 mounted thereon is rotated in a direction indicated by an arrow A about the Y' axis by the third correction mechanism 166 so as to obtain an appropriate image as indicated by a solid line 802.

After the position about the Y' axis is adjusted by the third correction mechanism 166 in the above-mentioned manner, the horizontal trapezoidal distortion correcting member 16 is fixed to the second member 62 with the screws 162, 163, 164, and 165.

The projection unit 3 is mounted on the third member 161 of the horizontal trapezoidal distortion correcting member 16.

Figure 9:
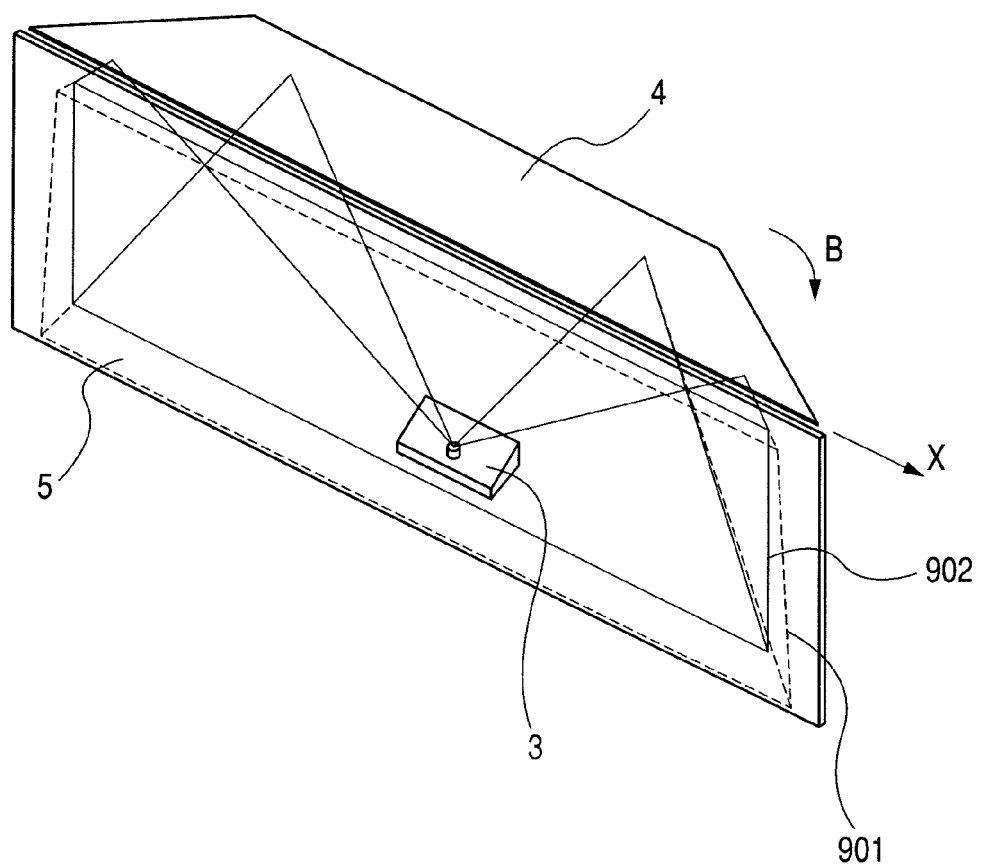
FIG. 9 is a diagram for illustrating an X-axis rotation mechanism.

Moreover, in Embodiment 1 of the present invention, the reflection mirror correcting member 8 is provided as an X-axis rotation mechanism. The reflection mirror correcting member 8 includes a reflection mirror mounting member (not shown) for supporting one end of the reflection mirror 4 on the rear surface side, and a reflection mirror holding member (not shown) for holding the reflection mirror mounting member in the housing 1. The reflection mirror correcting member 8 has a structure in which the reflection mirror 4 is supported on the screen 5 side in the upper portion of the housing 2 and the reflection mirror 4 is rotated with the one end of the reflection mirror 4 on the screen 5 side being as an axis, thereby enabling position adjustment of the reflection mirror 4. For example, in the case where the image to be projected on the screen 5 has a tilt (image with an upper side and a lower side which are not same in length) with respect to the screen 5 as indicated by a dotted line 901 of FIG. 9, the following adjustment is performed. The reflection mirror 4 is rotated in a direction indicated by an arrow B (downward) about an X axis by the reflection mirror correcting member 8 so as to obtain an appropriate image as indicated by a solid line 902.

Note that, though a detailed description is omitted, in the same manner as in a general rear projection type display apparatus, there can be provided a rotation mechanism for rotating the liquid crystal panel provided within the projection unit 3 with an optical axis being as a center, for example, so as to be capable of correcting the tile of the image. Moreover, there can be provided an X-axis translation mechanism and a Y-axis translation mechanism for the liquid crystal panel so as to be capable of correcting vertical and horizontal positions of the image. With such a structure, a 6-axis correction mechanism is provided.

Embodiment 2

A description is given of Embodiment 2 of the present invention.

A rear projection type display apparatus according to Embodiment 2 of the present invention includes a shelf on the bottom surface within the housing 2 as the first correction mechanism for moving the first member 61 in the direction parallel to the central light ray 11 of the image.

Figure 10:
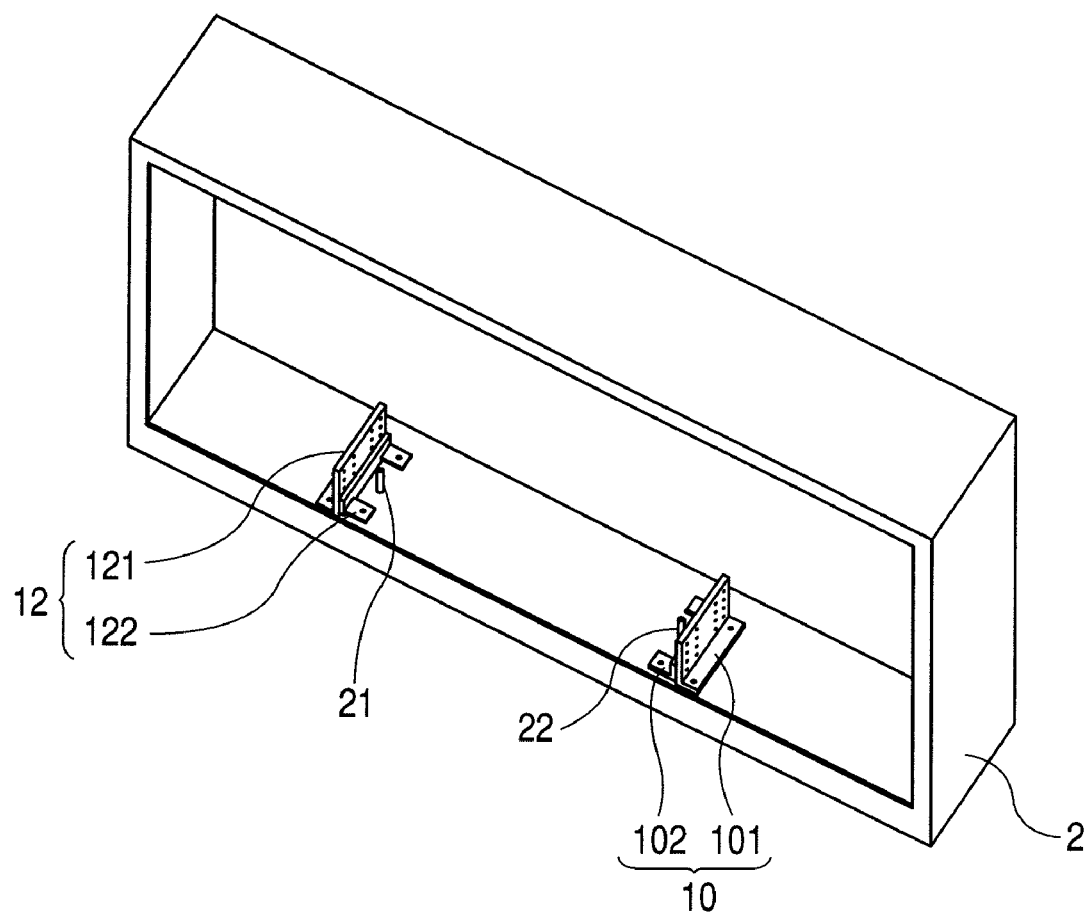
FIG. 10 is a perspective view of a housing of a rear projection type display apparatus according to Embodiment 2 of the present invention.

The shelf-like first correction mechanism 10 and 12 include the L-shape fixation members 101 and 121 for fixing the first correction mechanisms 10 and 12 on the bottom surface within the housing 2, and L-shape holding members 102 and 122 for holding the base portion of the first member 61, respectively (see FIG. 10).

Figure 11:
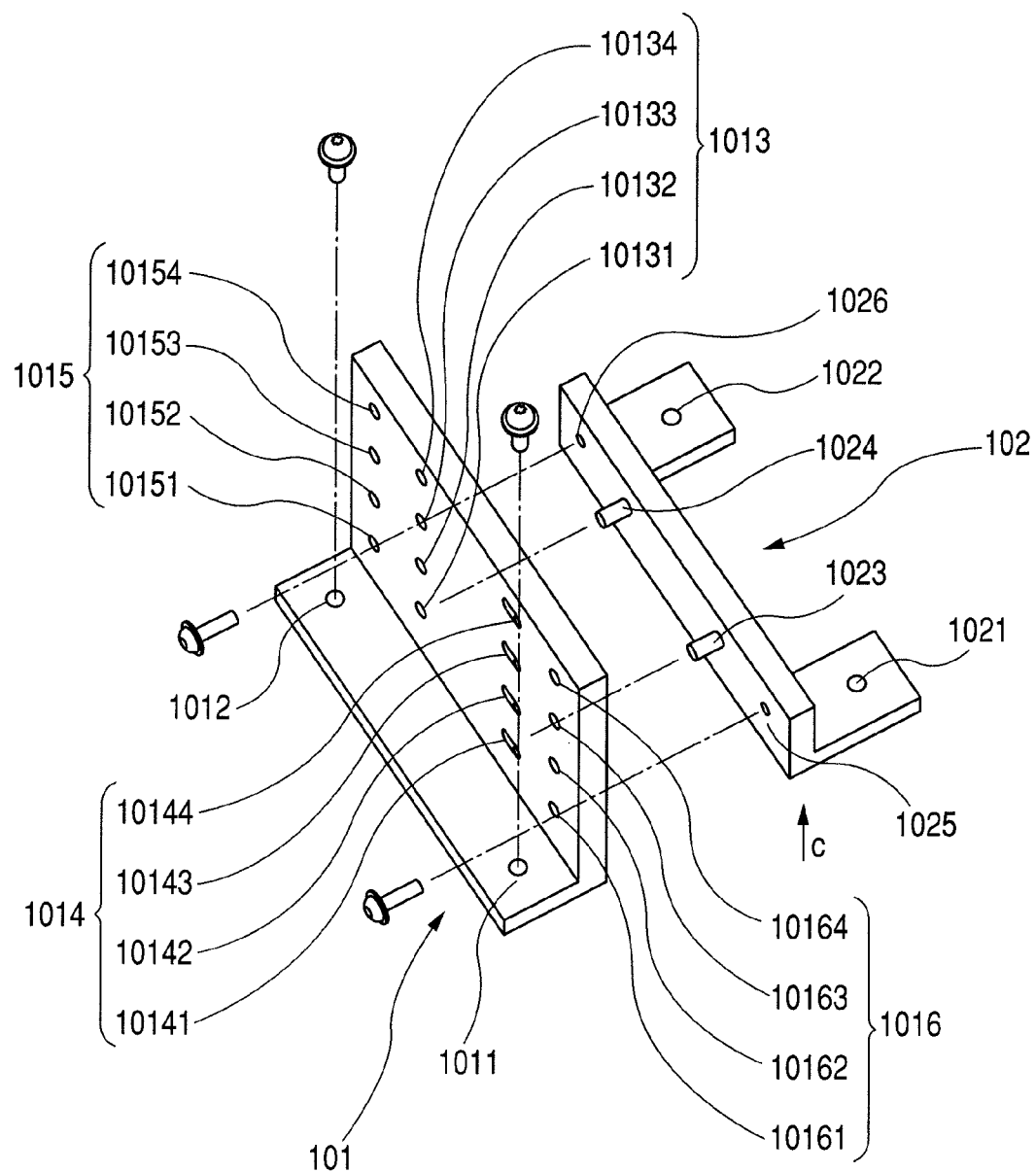
FIG. 11 is an exploded perspective view of a first correction mechanism of the rear projection type display apparatus.

The first correction mechanism 12 is a member provided symmetrically with respect to the first correction mechanism 10. Accordingly, the first correction mechanism 10 will be described as a typical example (see FIG. 11). In a horizontal portion of the fixation member 101, there are formed the through holes 1011 and 1012 through which screws for fixing the first correction mechanism 10 to the bottom surface within the housing 2 pass.

In a vertical portion of the fixation member 101, there are formed the lock holes 1013 and 1014 for sliding and positioning the holding member 102 for holding the base portion of the first member 61 stepwise. In addition, there are formed the through holes 1015 and 1016 through which screws for sliding and fixing the holding member 102 stepwise pass. In this regard, the lock hole 1014 is formed as a long hole in consideration of a fitting error.

In a horizontal portion of the holding member 102, there are formed the screw holes 1021 and 1022 for fastening screws for holding the base portion of the first member 61. In the vertical portion of the holding member 102, there are formed the coupling projections 1023 and 1024 to be engaged with the lock holes 1013 and 1014 of the fixation member 101, respectively. In addition, there are formed the screw holes 1025 and 1026 into which the screws passing through the through holes 1015 and 1016 of the fixation member 101 are screwed, respectively.

The holding member 102 is positioned such that the coupling projections 1023 and 1024 of the holding member 102 are engaged with the lock holes 1013 and 1014 of the fixation member 101, respectively, with respect to the L-shape fixation member 101 fixed to the bottom surface within the housing 2. Screws passing through the through holes 1015 and 1016 of the fixation member 101 are screwed into the screw holes 1025 and 1026 of the holding member 102, whereby the holding member 102 is fixed to the fixation member 101.

Figure 12:
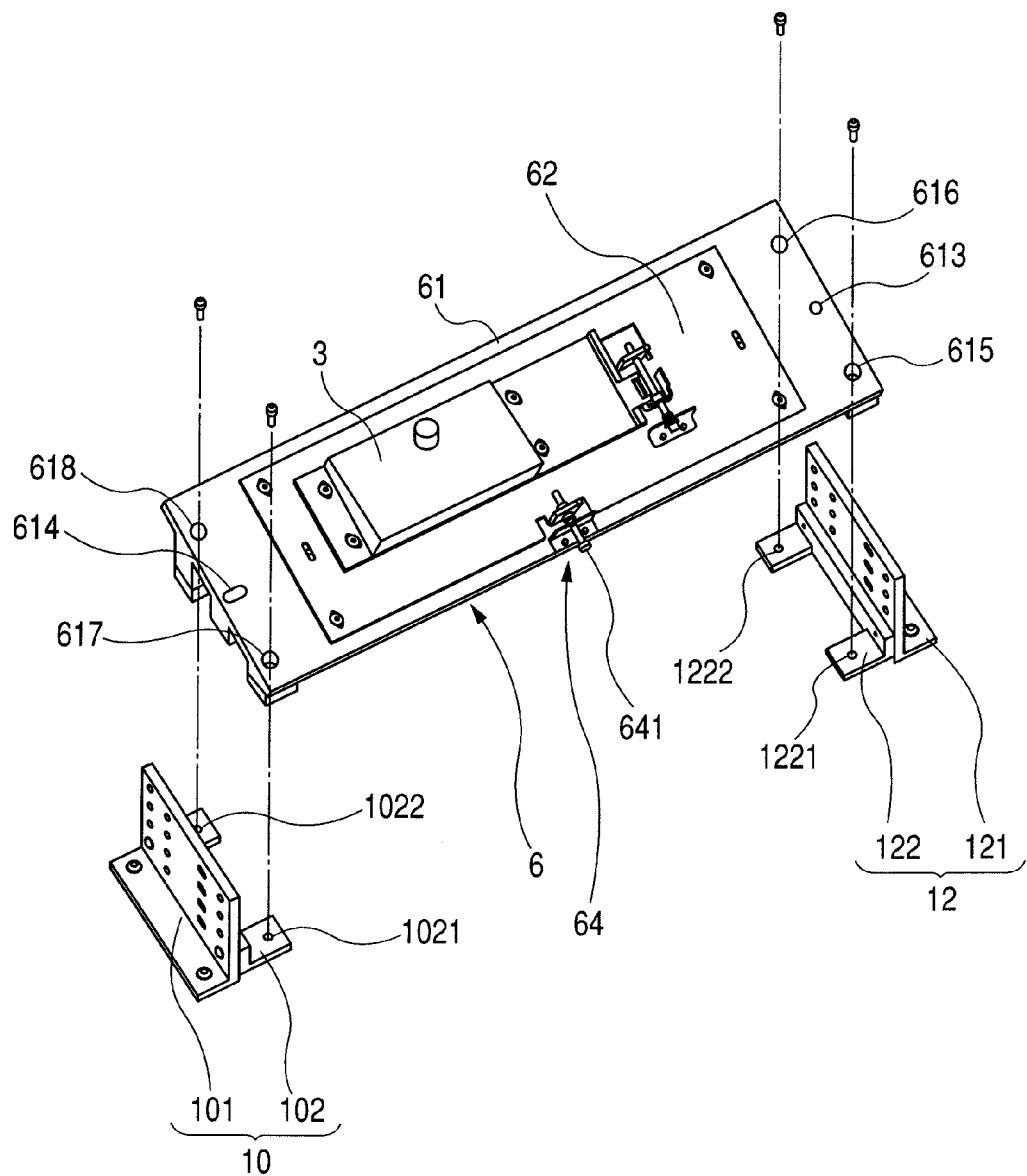
FIG. 12 is an exploded perspective view of the rear projection type display apparatus in a state where a base portion of a first member is mounted on the first correction mechanism.

The first correction mechanisms 10 and 12 are coupled to the base portion of the first member 61 such that the coupling projections 21 and 22 formed on the bottom surface within the housing 2 are engaged with the lock holes 613 and 614 of the base portion of the first member 61. The first correction mechanisms 10 and 12 are coupled to and fixed to the base portion such that screws passing through the through holes 615 and 616 of the base portion from above are screwed into screw holes 1221 and 1222 of the holding member 122 of the first correction mechanism 12, respectively, and screws passing through the through holes 617 and 618 of the base portion from above are screwed into the screw holes 1021 and 1022 of the holding member 102 of the first correction mechanism 10, respectively (see FIG. 12).

In order to perform the rough correction of the projection magnification with the first correction mechanism 10 (12) having the above-mentioned structure, the holding member 102 (122) for holding the base portion of the first member 61 is first moved in a direction indicated by an arrow C (Y-axis direction). Then, the coupling projections 1023 and 1024 of the holding member 102 (122) are engaged with the lock holes 1013 and 1014 formed at predetermined heights, and the holding member 102 and the fixation member 101 are fixed to each other with screws. In other words, also in Embodiment 2 of the present invention, the first member 61 is moved in the direction parallel to the central light ray 11 of the image in the same manner as in Embodiment 1, thereby enabling rough correction of the projection magnification.

Embodiment 3

A description is given of Embodiment 3 of the present invention.

Figure 13:
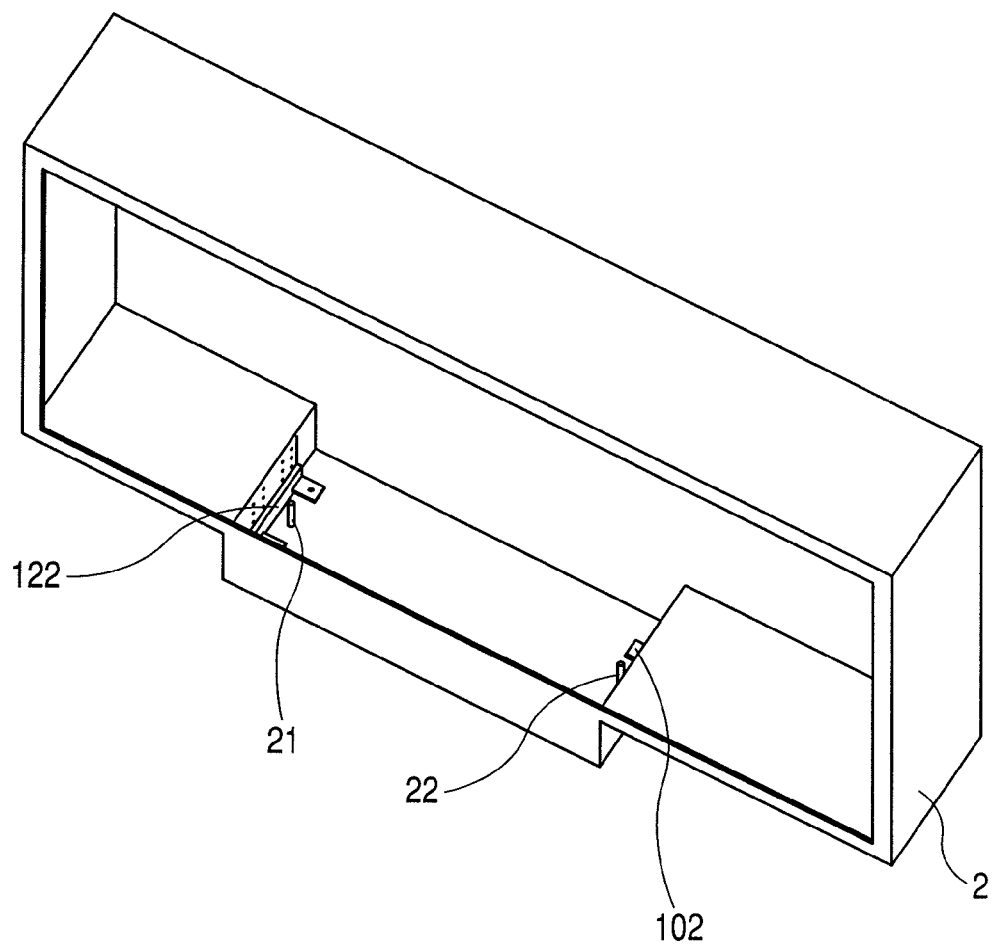
FIG. 13 is a perspective view of a housing of a rear projection type display apparatus according to Embodiment 3 of the present invention.
Figure 14:
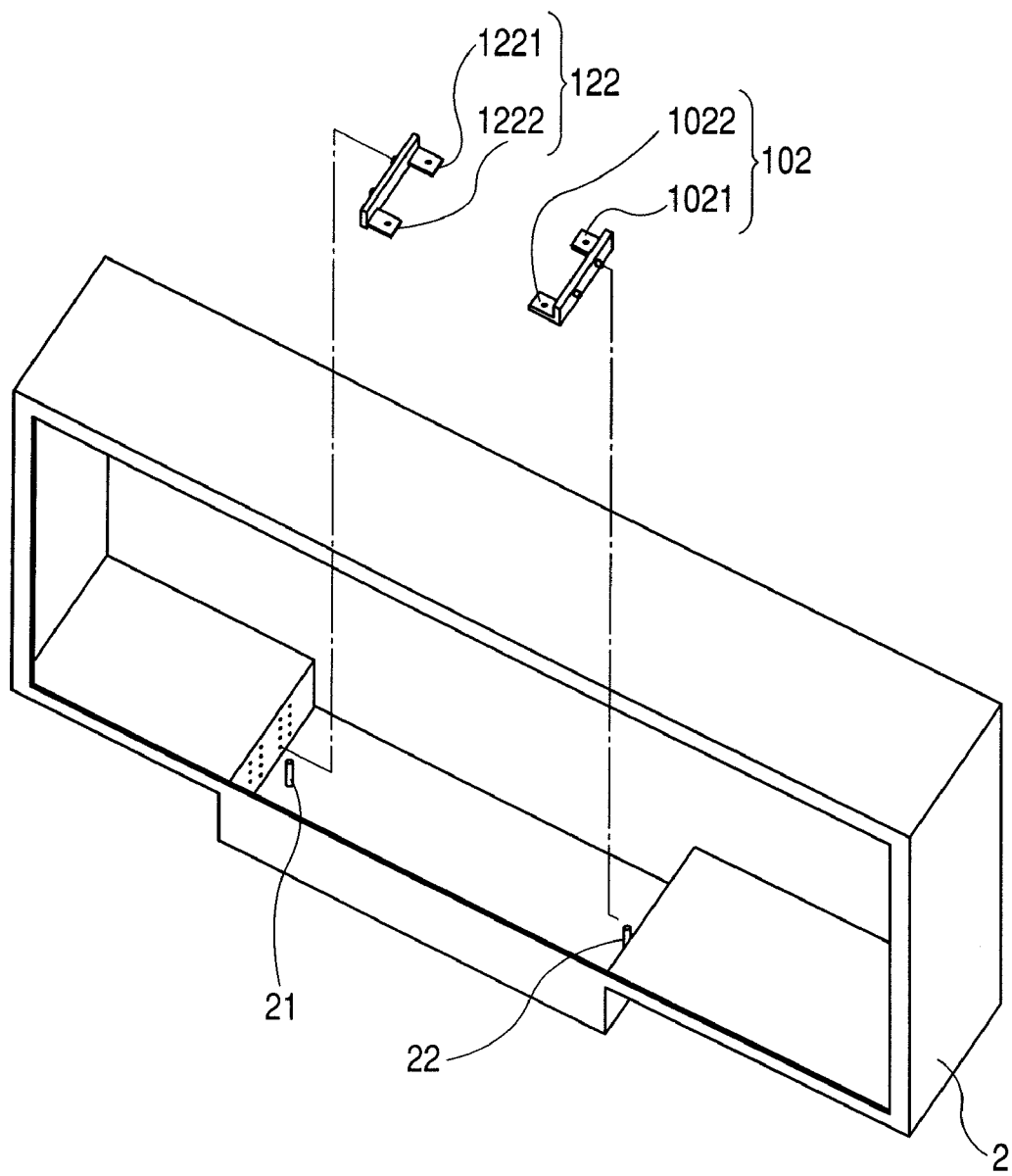
FIG. 14 is an exploded perspective view illustrating a state where a holding member for holding the base portion of the first member is mounted.

In a rear projection type display apparatus according to Embodiment 3 of the present invention, the L-shape fixation members 101 and 121 to be fixed to the bottom surface within the housing 2 according to Embodiment 2 are omitted, and a recessed portion is formed in the bottom surface within the housing 2. On left and right side surfaces of the recessed portion, the holding members 102 and 122 for holding the base portion of the first member 61 are mounted (see FIGS. 13 and 14).

On the left and right side surfaces of the recessed portion formed in the bottom surface within the housing 2, there are formed lock holes for sliding and positioning stepwise the holding member 102 for holding the base portion of the first member 61. In addition, there are formed through holes through which screws for sliding and fixing stepwise the holding member 102 pass.

Accordingly, in the case of performing the rough correction of the projection magnification, in the same manner as in Embodiment 2, the holding member 102 (122) for holding the base portion of the first member 61 is first moved in the Y-axis direction. Then, the coupling projections 1023 and 1024 of the holding member 102 (122) are engaged with the lock holes formed at predetermined heights in the recessed portion of the housing 2, and the holding member 102 (122) and the recessed portion are fixed to each other with screws. In other words, also in Embodiment 3 of the present invention, the first member 61 is moved in the direction parallel to the central light ray 11 of the image in the same manner as in Embodiments 1 and 2, thereby enabling the rough correction of the projection magnification.

Embodiment 4

A description is given of Embodiment 4 of the present invention.

Figure 15:
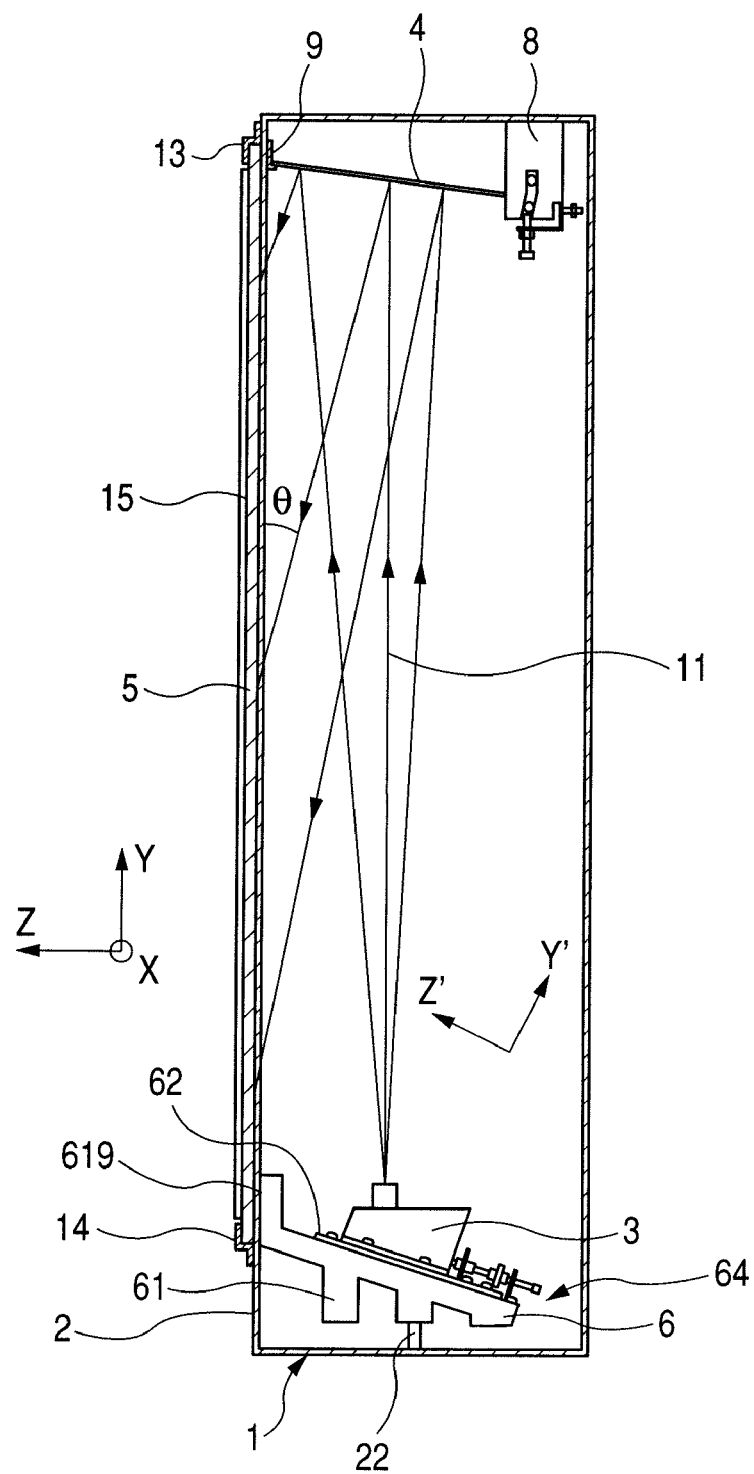
FIG. 15 is a side view of a rear projection type display apparatus according to Embodiment 4 of the present invention.

As illustrated in FIG. 15, a rear projection type display apparatus according to Embodiment 4 of the present invention includes a mounting portion which is formed on the screen 5 side within the housing 2 as the first correction mechanism, and a rising portion which is formed to the first member 61 of the projection magnification correcting member 6 so as to correspond to the mounting portion.

On the tilted plate of the first member 61, there is formed the rising portion 619 which rises substantially perpendicularly from an end of the tilted plate on the screen 5 side. On a surface of the rising portion 619 on the screen 5 side, coupling projections (not shown) are formed. In addition, there is formed through holes (not shown) through which screws for sliding and fastening fixing stepwise pass.

In the mounting portion of the housing 2, there are formed lock holes (not shown) for sliding and positioning the first member 61 stepwise. In addition, there are formed screw holes (not shown) into which screws for fixing the rising portion 619 of the first member 61 are screwed.

Figure 16:
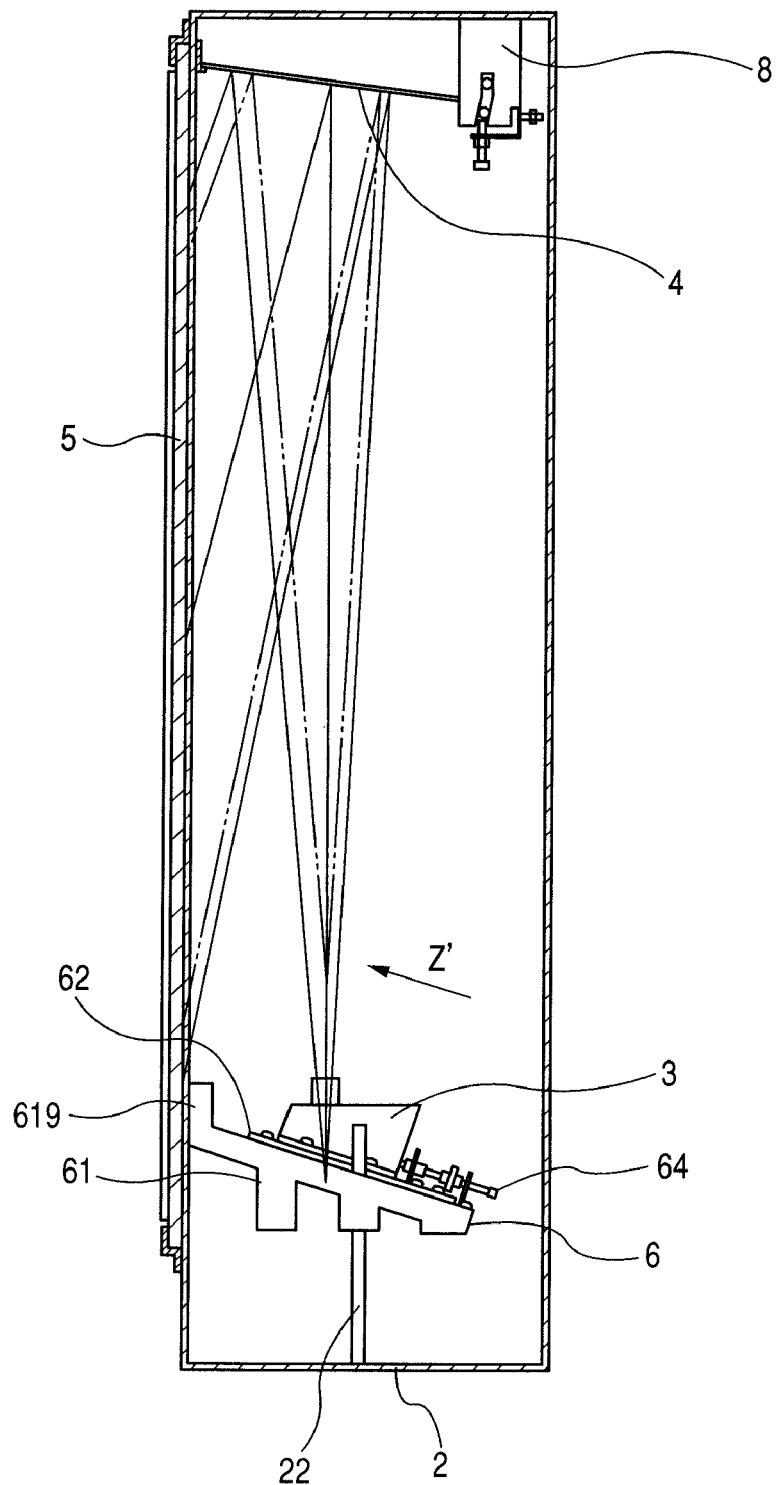
FIG. 16 is a side view of the rear projection type display apparatus in a state where the base portion of the first member is moved in a direction parallel to a central light ray of an image.

In order to perform the rough correction of the projection magnification with the first correction mechanism having the above-mentioned structure, the rising portion 619 of the first member 61 is first moved in the Y-axis direction. Such a state is illustrated in FIG. 16. Then, the coupling projections of the rising portion 619 are engaged with the lock holes formed at predetermined heights in the mounting portion of the housing 2, and the rising portion 619 and the mounting portion are fixed to each other with screws. In other words, also in Embodiment 4 of the present invention, the first member 61 is moved in the direction parallel to the central light ray 11 of the image in the same manner as in Embodiments 1, 2, and 3, thereby enabling the rough correction of the projection magnification.

Note that, in the above embodiments, the first member 61 of the projection magnification correcting member 6 is moved in the direction parallel to the central light ray 11 of the image, to thereby perform the rough correction of the projection magnification of the image. This is because, in a case of performing image adjustment, a displacement of the image in the Y direction with respect to the screen 5 is prevented from occurring. However, the first member 61 of the projection magnification correcting member 6 may be moved in a direction substantially parallel to the central light ray 11 of the image.

Similarly, regarding a moving direction of the second member 62 of the projection magnification member 6, the second member 62 may be moved in a direction substantially parallel to a normal line to an image plane enlarged and projected from the projection unit 3 without passing through the reflection mirror 4.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2007-069970, filed Mar. 19, 2007, which is hereby incorporated by reference herein in its entirety.

What is claimed is:

1. A rear projection type display apparatus, comprising:
a screen;
a projection optical system having at least one reflection mirror;
a projection unit for modulating an illumination light from a light source with a light valve and for enlarging and projecting the illumination light onto a rear surface of the screen with the projection optical system; and
a projection magnification correcting member,
light rays being projected from the projection unit so that a central light ray, which is a ray passing through a center of an image, is made incident on the rear surface of the screen at an angle other than 90 degrees through the at least one reflection mirror of the projection optical system, wherein
the projection unit is mounted on the projection magnification correcting member,
the projection magnification correcting member includes a first member and a second member;
the first member includes a first correction mechanism correcting a position of the projection unit in a direction substantially parallel to the central light ray, and is supported by a housing; and
the second member includes a second correction mechanism correcting a position of the projection unit in a direction substantially parallel to a normal line to an image plane enlarged and projected from the projection unit without passing through the reflection mirror, and is supported by the first member.

2. A rear projection type display apparatus according to claim 1, wherein the projection magnification correcting member includes a third member,
the third member including a third correction mechanism correcting a horizontal trapezoidal distortion of the image.

3. A rear projection type display apparatus according to claim 2, wherein the projection unit is mounted on the third member, which is mounted on the second member.

4. A rear projection type display apparatus according to claim 1, further comprising a reflection mirror correcting member to adjust a position of the reflection mirror.

5. A rear projection type display apparatus according to claim 1, wherein the first member is formed as a shelf within the housing.

6. A rear projection type display apparatus according to claim 1, wherein the housing includes a recessed portion, and the first member is disposed within the recessed portion.

7. A rear projection type display apparatus according to claim 1, wherein the first member includes a rising portion extending in a direction substantially parallel to the central ray.

8. A rear projection type display apparatus, comprising:
a screen;
a projection optical system having at least one reflection mirror;
a projection unit for modulating an illumination light from a light source with a light valve and for enlarging and projecting the illumination light onto a rear surface of the screen with the projection optical system; and
a projection magnification correcting member,
light rays being projected from the projection unit so that a central light ray, which is a ray passing through a center of an image, is made incident on the rear surface of the screen at an angle other than 90 degrees through the at least one reflection mirror of the projection optical system, wherein the projection unit is mounted on the projection magnification correcting member, the projection magnification correcting member including first means for correcting a position of the projection unit in a direction substantially parallel to the central light ray, and is supported by a housing; and second means for correcting a position of the projection unit in a direction substantially parallel to a normal line to an image plane enlarged and projected from the projection unit without passing through the reflection mirror, and is supported by the first means.

9. A rear projection type display apparatus according to claim 8, wherein the projection magnification correcting member includes third means for correcting a horizontal trapezoidal distortion of the image.

10. A rear projection type display apparatus according to claim 9, wherein the projection unit is mounted on the third means, which is mounted on the second means.

11. A rear projection type display apparatus according to claim 8, further comprising a reflection mirror correcting member to adjust a position of the reflection mirror.

12. A rear projection type display apparatus according to claim 8, wherein the first means is formed as a shelf within the housing.

13. A rear projection type display apparatus according to claim 8, wherein the housing includes a recessed portion, and the first means is disposed within the recessed portion.

14. A rear projection type display apparatus according to claim 8, wherein the first means includes a rising portion extending in a direction substantially parallel to the central ray.

* * * * *